United States Patent
Wessman et al.

(10) Patent No.: US 6,732,496 B1
(45) Date of Patent: May 11, 2004

(54) METHOD OF MONITORING TRANSVERSE SEALING IN A PACKAGING UNIT FOR CONTINUOUSLY FORMING SEALED PACKAGES CONTAINING POURABLE FOOD PRODUCTS

(75) Inventors: Bo Wessman, Eslöv (SE); Olof Tyllered, Modena (IT); Antonio Melandri, Bologna (IT)

(73) Assignee: Tetra Laval Holdings & Finance SA, Pully (CH)

(*) Notice: Subject to any disclaimer, the term of this patent is extended or adjusted under 35 U.S.C. 154(b) by 0 days.

(21) Appl. No.: 09/622,164

(22) PCT Filed: Apr. 13, 1999

(86) PCT No.: PCT/EP99/02480
§ 371 (c)(1),
(2), (4) Date: Aug. 14, 2000

(87) PCT Pub. No.: WO99/52776
PCT Pub. Date: Oct. 21, 1999

(30) Foreign Application Priority Data

Apr. 15, 1998 (EP) .............................. 98830228

(51) Int. Cl.$^7$ .............................................. B65B 51/10
(52) U.S. Cl. ........................... 53/479; 53/64; 53/75; 53/451; 53/551
(58) Field of Search ................ 53/551, 552, 451, 53/479, 75, 69

(56) References Cited

U.S. PATENT DOCUMENTS

| | | | | |
|---|---|---|---|---|
| 3,925,139 A | * | 12/1975 | Simmons | ...................... 53/53 |
| 4,704,509 A | | 11/1987 | Hilmersson et al. | |
| 4,825,625 A | * | 5/1989 | Hufford | ...................... 53/451 |
| 5,551,206 A | * | 9/1996 | Fukuda | ...................... 53/75 |
| 5,564,255 A | | 10/1996 | Giacomelli | |
| 5,573,613 A | * | 11/1996 | Lunden | ...................... 156/64 |
| 5,605,026 A | | 2/1997 | Schott et al. | |
| 5,616,199 A | * | 4/1997 | Jurrius et al. | ................ 156/311 |
| 5,624,528 A | | 4/1997 | Abrams et al. | |
| 5,787,681 A | * | 8/1998 | Papina et al. | ............... 53/373.7 |
| 5,793,148 A | | 8/1998 | Rabe | |
| 5,836,136 A | * | 11/1998 | Highberger | ..................... 53/75 |

FOREIGN PATENT DOCUMENTS

| | | |
|---|---|---|
| EP | 0 091 712 B1 | 5/1988 |
| EP | 0 274 641 | 7/1988 |
| EP | 0 314 548 A2 | 5/1989 |
| EP | 0 362 799 | 4/1990 |
| EP | 0 460 540 A1 | 12/1991 |
| EP | 0 536 447 A1 | 4/1993 |
| EP | 0 731 028 | 9/1996 |
| EP | 0 887 263 A1 | 12/1998 |
| FR | 2 502 441 A | 9/1982 |
| GB | 2 091 428 A | 7/1982 |
| JP | 03 148427 A | 6/1991 |
| JP | 04 142231 A | 5/1992 |
| JP | 05 310226 A | 9/1993 |
| WO | 93 18247 A | 9/1993 |
| WO | 96 20823 A | 7/1996 |

* cited by examiner

*Primary Examiner*—Stephen F. Gerrity
*Assistant Examiner*—Hemant A. Desai
(74) *Attorney, Agent, or Firm*—Burns, Doane, Swecker & Mathis, L.L.P.

(57) ABSTRACT

The method is aimed at indirectly determining the energy absorbed by a conducting layer (5) forming part of a strip of packaging material (1) to be sealed transversely. The method is based on measuring parameters correlated with the power supplied by a current source (45) to the packaging material (1) during sealing, and with the temperature of the conducting layer (5). The temperature measurement takes into account the temperature of the product to be packed, the characteristics of the packaging material, and the characteristics of the mechanical sealing members; correct cutting of the packaging material after sealing is also determined; and the parameters are monitored by measuring associated quantities and by comparison with permissible values.

51 Claims, 4 Drawing Sheets

METHOD OF MONITORING TRANSVERSE SEALING IN A PACKAGING UNIT FOR CONTINUOUSLY FORMING SEALED PACKAGES CONTAINING POURABLE FOOD PRODUCTS

TECHNICAL FIELD

The present invention relates to a method of monitoring transverse sealing on a packaging unit for continuously forming sealed packages containing pourable food products.

BACKGROUND OF THE INVENTION

Many pourable food products, such as fruit juice, pasteurized or UHT (ultra-high-temperature treated) milk, wine, tomato sauce, etc., are sold in packages made of sterilized packaging material.

Figure 1:
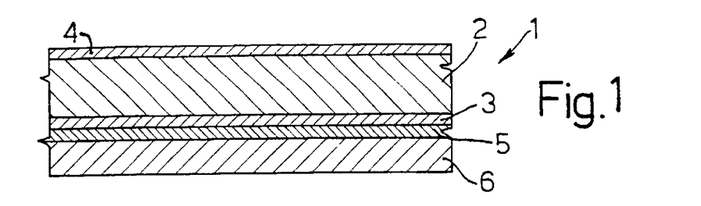
FIG. 1 shows a cross section of a strip of packaging material.

A typical example of such a package is the parallelepiped packaging container for liquid or pourable food products known by the name of Tetra Brik Asepti(registered trademark), which is formed by folding and sealing a strip-rolled packaging material. The packaging material, a cross section of which is shown in FIG. 1 in which the material is indicated as a whole by 1, comprises a layer of fibrous material 2, e.g. paper, covered on both sides with two layers of thermoplastic material 3, 4, e.g. polyethylene; and, adjacent to the layer of thermoplastic material 3 facing inwards of the container, there is a barrier layer 5 of electrically conducting material, e.g. aluminium, in turn covered with a further layer of thermoplastic material 6, preferably also polyethylene.

Figure 2:
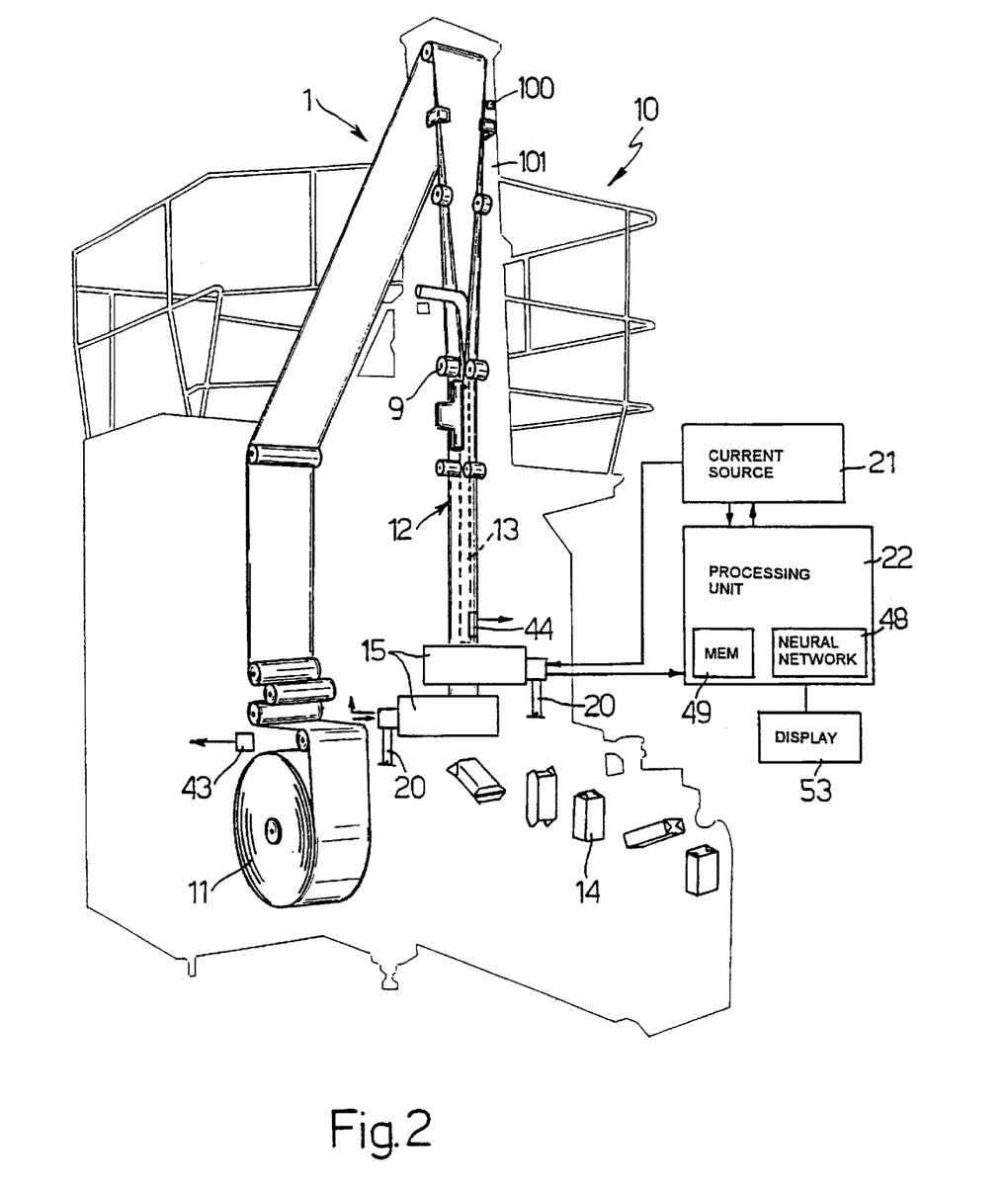
FIG. 2 shows, schematically, a packaging unit for forming packages.

As described for example in EP-A-0 460 540, such packages are produced on fully automatic packaging units, as shown and indicated by 10 in FIG. 2, on which the strip 1 of packaging material, fed off a reel 11, is sterilized (not shown), e.g. by applying a chemical sterilizing agent, such as a hydrogen peroxide or nitrogen peroxide solution; following sterilization, the sterilizing agent is removed, e.g. vaporized by heating, from the surfaces of the packaging material; and the strip 1 of packaging material so sterilized is kept in a closed sterile environment, and is folded and sealed longitudinally by means of rollers 9 to form a tube 12.

The tube 12 is filled with the sterilized or sterile-processed food product by means of a filling conduit 13, and is sealed and cut at equally spaced cross sections into pillow-pack packages, which are subsequently folded mechanically to form final packages 14, in the example shown of parallelepiped shape.

More specifically, sealing and cutting are performed by means of jaws 15 operating on one side of tube 12 and cooperating with respective counter-jaws not shown in FIG. 2. Jaws 15 and the respective counter-jaws move back and forth lengthwise of tube 12 (to move into position over the sealing and cutting region, and to follow the forward movement of tube 12 as it is being sealed and cut), and move to and from tube 12, as described in detail in EP-B-0 091 712. For which purpose, jaws 15 and the respective counter-jaws are controlled by rods 20 shown only schematically in FIG. 2 and controlled by cams not shown.

Each jaw 15 carries a respective inductor, as explained in detail later on, which is supplied by a high-frequency current source 21 to induce current in and so heat barrier layer 5 by the Joule effect. The facing layers of thermoplastic material 5 and 6 are thus softened, and simultaneous compression of tube 12 by the jaw/counter-jaw pair seals tube 12 transversely.

A central processing unit 22 controls and monitors the entire operation of packaging unit 10 to ensure the various operations are synchronized properly, to indicate any malfunctions, and to reject any packages 14 which cannot be guaranteed up to standard.

On units of the above type, sealing quality control is obviously of vital importance, both to ensure the production of perfectly sound packages, and to preserve the aseptic characteristics of the contents, on which the health of the consumer depends.

Consequently, a strong demand exists for some way of monitoring sealing to determine the quality of the seal and, in the course of the production process, determine any departure from the established standard quality level requiring corrective measures or rejection of the packages.

At present, quality control is based on determining the electric parameters (current, output voltage) and correct operation of the generator, and on manual inspection of the packages by the operator, which may consist solely in visual examination of the outside of the package, or also in tearing open the package to examine it from the inside and determine the tear resistance. Manual inspection, even when performed only externally, is obviously extremely slow with respect to the packaging speed of the unit, and, when performed internally, only allows of checking random samples. As a result, in the event of a faulty seal being detected, a large amount of product is wasted in the time interval between detecting the fault and arresting packaging unit 10. Moreover, the tedious nature of the job makes manual inspection fairly unreliable, due to possible distraction on the part of the operator.

On the other hand, checking the electric parameters alone is not enough, and only some of the parameters affecting sealing quality—parameters relating to the characteristics of the material for sealing, the characteristics of the sterile product, operation of the sealing components, and sometimes random factors (one example which applies to all: the presence of product fibers or seeds in the sealing region)—are detectable directly by means of appropriate sensors. Moreover, the effects of some situations, not critical in themselves, at times combine unexpectedly to produce critical conditions (e.g. a slight increase in the thickness of the packaging material combined with a small reduction in current supply may result in a poor seal), so that detecting individual sealing parameters and comparing them with respective threshold values is not enough to detect all the critical situations that may arise. On the other hand, creating a mathematical model capable of taking into account all the effects and parameters involved would be impossible, on account of the complexity of the system.

To control transverse sealing quality, methods are currently being studied based on measuring the output power of the generator. Such methods, however, only provide for indicating a few malfunctions relative, for example, to faults on the current source itself, and, as the power supplied is never exploited fully, fail to provide for evaluating all the aspects affecting sealing quality.

A demand therefore exists for a reliable quality control method capable of rapidly indicating any critical situation that may arise.

DISCLOSURE OF INVENTION

It is an object amongst other objectives of the present invention to provide a quality control method which is more complete and more reliable as compared with known methods.

According to the present invention, there is provided a method of monitoring transverse sealing on a packaging unit for continuously forming sealed packages containing pourable food products, as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Before describing the method according to the present invention, a brief description will be given of the transverse sealing members of the packaging unit and the relative sensors specifically provided to implement the method. Any, even adjacent, members not essential to an understanding of the present invention (such as the cutting members and devices for shaping packages 14, also associated with the jaw/counter-jaw pairs) are omitted.

Figures 3, 4, 5:
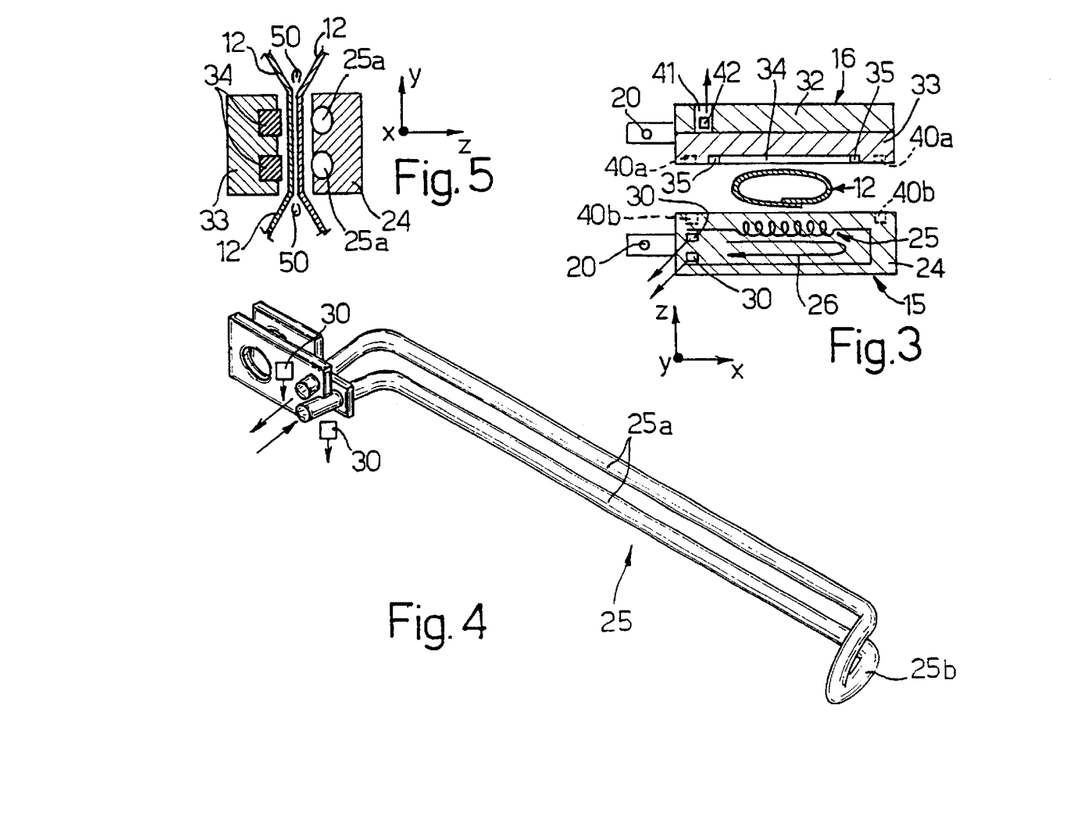
FIG. 3 shows a schematic top plan view of a jaw and respective counter-jaw, wherein the inductor is shown rotate 90° for the sake of clarity.
FIG. 4 shows a view in perspective of the turn of the inductor carried by the FIG. 3 jaw.
FIG. 5 shows a cross section of the FIG. 3 detail.

FIG. 3 shows a simplified view of a pair defined by a jaw 15 and respective counter-jaw 16. As can be seen, jaw 15 comprises an elongated support 24 of ferromagnetic material (extending in direction X) housing an inductor 25 defined by a single turn shown in FIG. 4. More specifically, the turn of inductor 25 comprises two straight portions 25a extending parallel to each other and lengthwise of support 24 (in direction X); and a U-shaped connecting portion 25b. Inductor 25 is hollow to permit the passage of a cooling fluid, e.g. water, as shown symbolically in FIG. 3 by arrow 26; and temperature sensors 30 (e.g. thermocouples) are provided at the inlet and outlet of the cooling circuit to measure the temperature of the incoming and outgoing water.

Counter-jaw 16 in turn comprises a supporting body 32, and a pressure bar 33 housing a pair of pressure elements 34 made of elastic material (e.g. rubber), extending lengthwise of pressure bar 33, and facing the two straight portions 25a of inductor 25 (FIG. 5). The longitudinal ends of pressure elements 34 have end elements 35 for locking pressure elements 34 in position, and the absence or breakage of which may affect the rigidity of pressure elements 34 and so affect sealing as explained later on.

Each counter-jaw 16 carries two distance sensors 40a located beneath and to the side of pressure elements 34, and cooperating with respective plates 40b carried by corresponding jaw 15 and located beneath and to the side of inductor 25. Distance sensors 40a, which are preferably inductive, measure the distance between jaw 15 and respective counter-jaw 16 at two longitudinally remote points, and supply respective signals to processing unit 22. The distance values are preferably acquired just before and just after the sealing current pulse is supplied to inductor 25, as described later on. In the alternative, acquisition may occur at any appropriate time which is found to be effective for avoiding electrical noise or mechanical interference. On the basis of the two pairs of acquired distance values, processing unit 22 is able to determine compression of the packaging material, which, in the case described with reference to FIG. 1, amounts to about 40–100 $\mu$m.

Each counter-jaw 16 has a hydraulic piston 41 to control the gripping movement of pressure bar 33 towards the facing jaw 15 and compress packaging material 1 at high pressure (usually of about 100 bars). Hydraulic piston 41 has a hydraulic pressure sensor 42 for measuring the force with which the packaging material 1 is compressed during sealing.

Finally, packaging unit 10 comprises a thickness sensor, indicated schematically at 43 in FIG. 2, for determining the thickness of aluminium layer 5; a product temperature sensor 44, and a temperature sensor 100 in the aseptic chamber 101 of the packaging unit 10. Aluminium thickness sensor 43 is conveniently inductive (e.g. ONROX AB component 67370), generates a thickness-related electric output signal supplied to processing unit 22, and may either be operated continuously or activated only when reel 11 is changed, assuming a constant thickness of the aluminium foil of the packaging material in reel 11. Product temperature sensor 44 is preferably defined by a thermocouple, and is located close to or at the outlet of filling conduit 13 to determine the actual temperature of the processed product. The temperature sensor 100 in the aseptic chamber 101 is preferably constituted by a thermocouple, which is arranged in the upper part of the chamber 101 in order to detect the temperature of the tube 12 containing the product.

Figure 6:
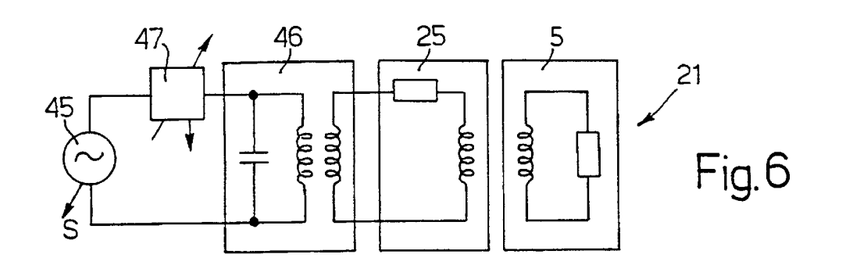
FIG. 6 shows an electric diagram of the generator of the packaging unit.

Sealing occurs upon the generator 21 generating an alternating-current pulse (e.g. about 170 ms, 500 kHz, ±20 kHz). To this end, (refer to FIG. 6) current source 21 comprises a generator circuit 45 connected to a transformer 46 and containing the sealing electric parameter control elements and relative control logic (including a PLC not shown). FIG. 6 also shows the electric equivalents of inductor 25 and aluminium layer 5, which, together with transformer 46, represent the load seen by generator circuit 45. A measuring device 47 provides for measuring the electric parameters (voltage, current and phase angle, i.e. the phase difference between current and voltage) of the output signal of generator circuit 45, and for supplying them to processing unit 22 (FIG. 2). Current source 21 also supplies processing unit 22 with a sealing control signal S, and possibly also a load error signal, in the event highly anomalous controlled electric parameter values (supply voltage, output voltage and current) indicate a load other than the nominal load at the set operating frequency. These signals are used for checking sealing as described below. In particular, sealing control signal S is used by processing unit 22 to acquire the data supplied by the various sensors and measuring devices.

Figure 7:
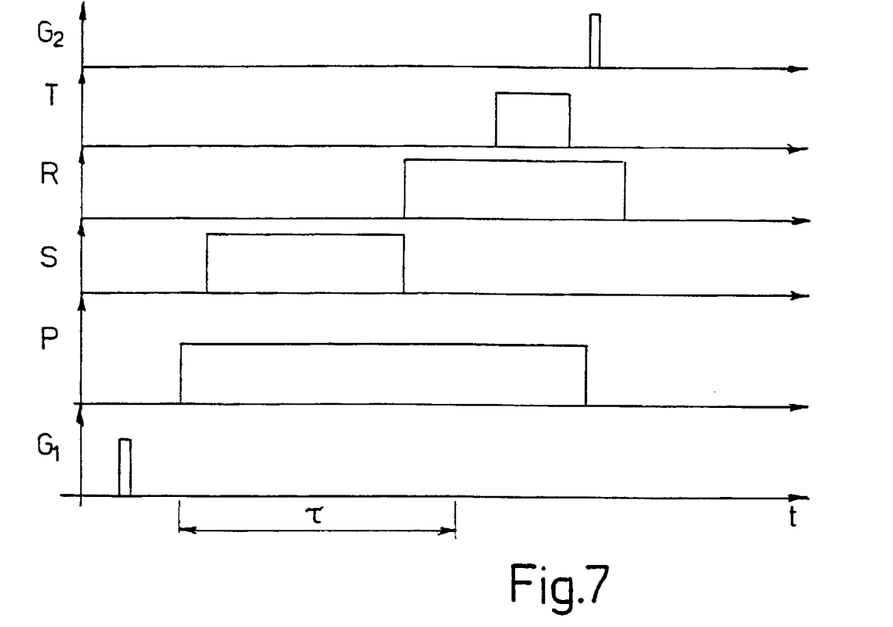
FIG. 7 shows a sealing time plot.

The sealing sequence is shown in the FIG. 7 time graph, in which G1 and G2 indicate the closing and opening commands respectively of a jaw 15/counter-jaw 16 pair; P indicates the compression command (operation of hydraulic piston 41); S indicates the sealing pulse; R indicates cooling of the inductor; T indicates the cutting command; and $\tau$ indicates the time range in which processing unit 22 acquires the sealing check data, such time range being extendable till after the cutting for a more complete measurement of the compression.

In all, processing unit 22 therefore acquires the following signals the sealing pulse, load error, temperature error of the generator, and voltage, current and phase angle values supplied by source 21; the distance values, supplied by sensors 40a before and after sealing, between each jaw and respective counter-jaw; the hydraulic pressure value supplied by pressure sensor 42; the cooling water temperature supplied by sensors 30; the product temperature supplied by sensor 44; the aseptic chamber 101 temperature supplied by sensor 100; and the thickness of the aluminium layer supplied by sensor 43.

On the basis of these signals, processing unit 22 calculates the values of other sealing check quantities. In particular, it calculates load impedance as the ratio between voltage and current; the energy of the current supplied by generator circuit 45; the difference in water temperature between the inlet and out-let; right- and left-side post-sealing compression of the material, as the difference between the distance measured before and after sealing; mean compression; and overall changes in voltage, current and phase-angle during the sealing pulse. These quantities, together with those measured directly, are evaluated directly to determine any sealing error conditions when a direct correlation exists, or are processed by means of a neural network (48 in FIG. 2) subjected beforehand to a learning process by entering measured quantities relative to correct seals, and measured quantities relative to known sealing errors. Neural network 48 (preferably software-implemented) is therefore able to indicate error conditions that cannot be detected by simply comparing the monitored quantities with permissible values. In both cases, when the type of fault responsible for the sealing error cannot be indicated directly, processing unit 22 indicates at least a set of faults in which to search for the actual cause of the error.

Figure 8:
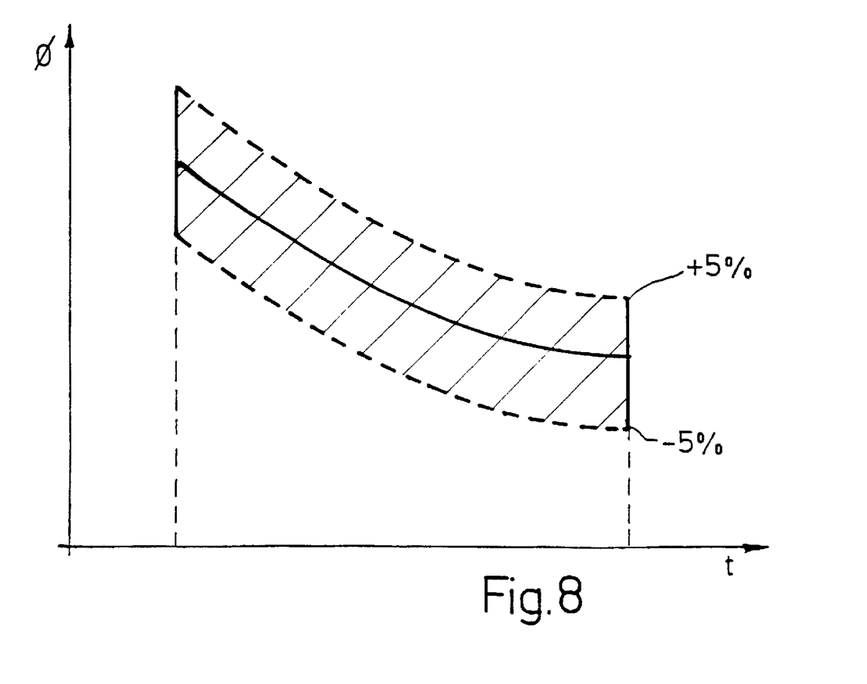
FIG. 8 shows a plot of a quantity measured during sealing.

In particular, processing unit 22 checks the following conditions or parameters, which may be responsible for improper sealing:

1. Variations in the supply voltage of current source 21 ($\geq 20\%$ with respect to the nominal value). These may prevent sealing or at any rate produce a poor or partial seal, and give rise to a load error which is indicated directly by current source 21.
2. Cut in current supply due to a fault in current source 21. This prevents sealing, and is detected directly on the basis of the output current.
3. Other than nominal sealing time. This may be caused by a fault in the control logic circuit (in generator circuit 45) generating sealing pulse S; is detected directly, to 5 ms precision, on the basis of the duration of sealing pulse S; and gives rise to a variation in the energy transmitted.
4. Energy loss of the inductor. This may be caused by a connection problem on the inductor; normally results in a poor seal; and may cause variations in compression (reduced compression due to nonfusion of the thermoplastic layers), in the temperature difference between the incoming and outgoing cooling water (lower than nominal temperature, due to reduced heating of inductor 25), and in the impedance value.
5. Creeping currents. These are due to connection problems on inductor 25, and give rise to variations in the phase angle.
6. Transient resistances. These are also caused by connection problems, and give rise to variations in the phase angle, which, during sealing, normally has a pattern, one example of which is shown qualitatively in FIG. 8, but which, when sealing problems arise, often comprises peaks outside an acceptance range of, say, ±5%.
7. Cooling of the inductor. This is correlated with the power transferred to the inductor, and can be monitored on the basis of the cooling water temperature detected by sensors 30 before and after sealing.
8. Temperature and variations in the temperature of the product supplied by conduit 13. These affect sealing quality, by the product, if very cold, possibly absorbing part of the energy transmitted to aluminium layer 5 and so preventing or reducing fusion of the thermoplastic material, and are detected by sensor 44.
9. Variations in the thickness of aluminium layer 5. A variation of over 10% of the nominal value is detected directly by sensor 43, and results in anomalous impedance and phase angle values; a variation of less than 10% is detected on the basis of the impedance and phase angle values.
10. Grammage of fibrous layer 2. This is correlated with the thickness of layer 2, which, if too thick, may act as an insulating layer and prevent energy being transferred from inductor 25 to aluminium layer 5, and, if too thin, may result in poor resistance of packaging material 1 and the seal; and gives rise to variations in the compression value, and in the first distance measurement (between the jaw and counter-jaw before sealing).
11. Local variations in the thickness of thermoplastic layers 4 and 6. These may prevent energy from being transferred to aluminium layer 5, if too thick, or may define too thin a sealing region that is easily torn, if too thin; and are detected by variations in the mean and/or right or left compression values.
12. Thickness of thermoplastic layers 4 and 6. This has the same effects as in point 11), and is detected indirectly by measuring compression.
13. Quality of the thermoplastic material. This affects the degree of fusion and the compression measurements, and is important for detecting errors in the loading of a new reel 11, since the characteristics of the thermoplastic material may differ depending on the product being packed.
14. Type of packaging material. As in the previous case, any problems arising in connection with this parameter are due to errors when loading a new reel; affects compression and the detected phase angle.
15. Variations in pressure distribution in direction X. These may give rise to an uneven seal and the formation of gobs of plastic, as shown by way of example by 50 in FIG. 5, on one side of the package. In some cases, such gobs may even form an irregular undulated bead, and give rise to problems when transporting the packages. That is, being rough and projecting from the package, they are easily subjected to forces resulting in tearing of the package. Such variations are detected indirectly by measuring compression.
16. Jaw pressure. Tests have shown a substantially linear correlation between the power absorbed during sealing and compression of the packaging material, which in turn depends on the pressure of the jaws. Monitoring the jaw pressure, which may be done directly by sensor 42 or indirectly on the basis of the compression value, is therefore important in determining the quality of the seal.
17. Presence and soundness of end elements 35, which, as stated, may affect the rigidity of pressure elements 34 and the pressure exerted on tube 12 during sealing. Both are detected indirectly by measuring compression.
18. Partial defects in pressure elements 34. These prevent correct compression, and are detected on the basis of compression values.

19. Lack of parallelism between inductor 25 and pressure elements 34. This may be due to the presence of hard foreign bodies (seeds, fibers, masses of product) inside tube 12, or to mechanical problems in setting packaging unit 10; may give rise to an uneven seal and/or the formation of gobs 50; and affects the compression value.
20. Movement of the cutting blades. Cutting is normally performed after sealing, but, when performed erroneously before the seal is complete, may prevent correct sealing. This parameter affects the phase angle and impedance and, indirectly, the compression.

The above points are generally aimed at indirectly determining the energy absorbed by aluminium layer 5. In particular, points 1—3 provide for determining efficient operation of generator circuit 45 (and hence the power supplied by the source to inductor 25); points 47 are correlated with the power transferred by inductor 25 (that is, points 1–7 together define the parameters related to the power supplied by source 21 to the packaging material during sealing); points 8–19 are correlated with the temperature of aluminium layer 5: that is, point 8 due to the temperature of the product to be packed, points 9–14 due to the characteristics of the packaging material, and points 15–19 due to the characteristics of the mechanical sealing members (that is, points 9–19 affect compression of packaging material 1); and, finally, point 20 is aimed at monitoring a further parameter which may affect sealing quality.

As can be seen from the above list, each parameter or critical condition is not correlated univocally with the quantities monitored. Which means simply monitoring the above quantities is not enough to obtain univocal information concerning the problem, seeing as how the same variation (e.g. an anomalous current value) may be due to a whole host of causes and/or critical parameters.

Figure 9:
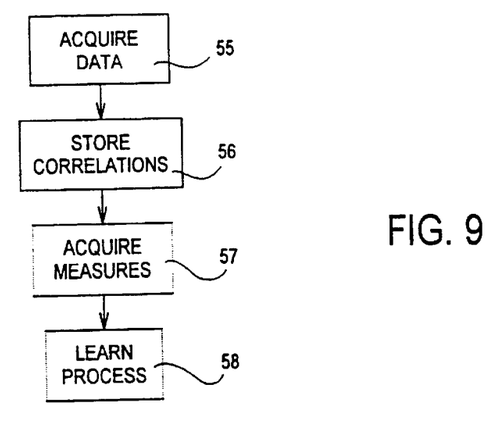
FIGS. 9–11 show flow charts of the method according to the present invention.

To solve the above problem, as shown in the FIG. 9 flow-chart, processing unit 22 acquires, at the learning stage, the monitored parameters, the relative physical causes, and the nominal or permissible values of the measured or calculated quantities, i.e. the relative threshold values (block 55), and then memorizes the relationship between the monitored quantities and the listed parameters (and relative causes) in appropriate memory areas 49 in the from of maps (block 56). If provided, neural network 48 acquires, at the learning stage, the measured quantities relative to known critical conditions and correct sealing conditions (block 57), so as to learn the possible connections and excursion ranges of the various quantities in different critical conditions (block 58).

Figure 10:
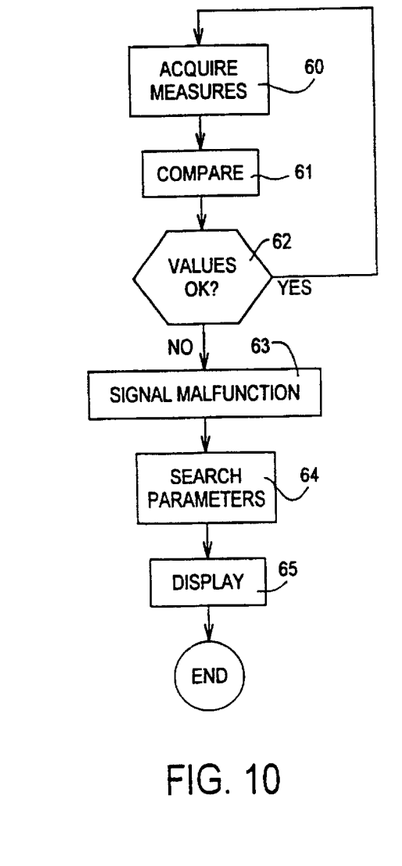

At the operating stage (FIG. 10), processing unit 22 acquires the quantities measured by sensors 30, 40a, 42, 43 and 44, the electric quantities and signals supplied by current source 21, and any other information supplied by the operator (block 60), and, at each sealing cycle, compares the monitored electric quantities with predetermined reference values (block 61). If one or more of the quantities are outside the variation range defined by said reference values (NO output of block 62), processing unit 22 signals a malfunction to the operator and, if necessary, stops the packaging unit 10 (block 63), and searches for the parameters associated with the detected measurements in the critical maps memorized in memory areas 49 (block 64). The memory search normally supplies a number of critical conditions associated with the detected quantity values, which conditions are then displayed (block 65) on a display 53 (FIG. 2) to enable the operator to investigate on the basis of a small number of possible faults. When the same critical condition affects several monitored quantities, and the affected quantities are found to be abnormal, the range of possible faults to be examined is obviously reduced.

Figure 11:
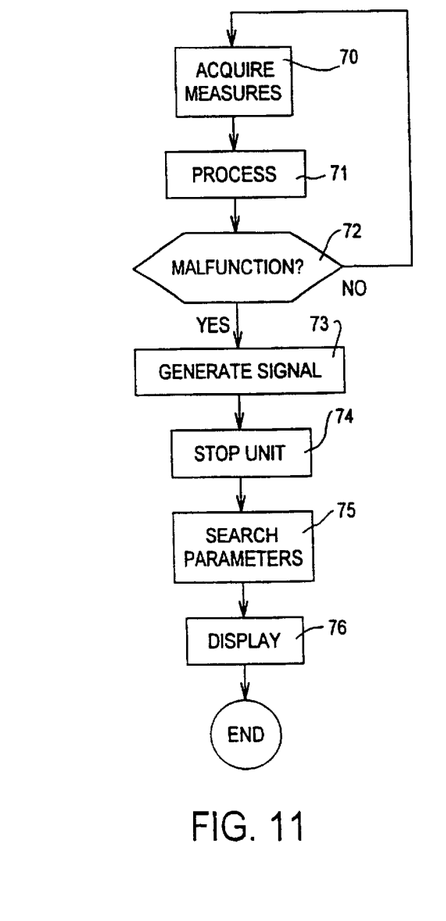

As shown in FIG. 11, following acquisition of the measured and calculated quantities (block 70 similar to block 60 in FIG. 10), the monitored quantities are supplied to neural network 48, if provided, which processes them (block 71) to determine whether or not a malfunction is present (block 72). In the event of a malfunction (YES output), neural network 48 generates a corresponding fault signal (block 73), and processing unit 22 arrests the packaging unit (block 74), searches for the corresponding parameters (block 75 similar to block 64), and displays both the fault signal and the parameters and possible associated faults (block 76) to a greater degree of certainty as compared with merely checking the monitored quantity values, and also taking into account any synergic effects.

Processing unit 22 conveniently memorizes the monitored quantities in an appropriate memory area, together with a package identification number, which is also printed on the package, e.g. preprinted on packaging material 1. The packaging conditions of each package are thus memorized, so that, should any problems arise, the "history" of the package may be retrieved.

The advantages of the method described are as follows. Firstly, it provides for extensively monitoring all the critical conditions of the packaging unit, to supply reliable information concerning critical situations or faults, and so ensure the required packaging quality. Secondly, it provides for immediately detecting, as soon as the package is formed, any faults or malfunctions capable of impairing the quality of the seal, thus cutting losses in the event packaging unit is arrested. Thirdly, the method assists the operator by narrowing down the possible causes of a fault, and so reducing the number of parts to be inspected and the time taken to detect the cause of the fault.

Clearly, changes may be made to the method as described and illustrated herein without, however, departing from the scope of the accompanying Claims.

For example, the above described method can be used on chain-type packaging machines of the type described, e.g., in European patent application No. 97830312.1, filed on 27, Jun. 1997 by the same applicant.

Furthermore, the produced packages can be appropriately printed, e.g. successively numbered, such that the monitored data of each individual package can be easily traced.

What is claimed is:

1. A method of monitoring transverse sealing on a packaging unit comprising a sealing current source and at least one pair of jaws; at least a first of the jaws in said pair carrying an inductor; the method comprising the steps of:

compressing a tube of packaging material, the packaging material having at least one electrically conducting layer, a heat-seal layer, and a layer of fibrous material which is filled with a pourable food product;

supplying said inductor, during the compression step, with an electric current to generate a sealing current in said electrically conducting layer;

measuring electric output quantities relative to said electric current, wherein the operation of measuring electric output quantities correlates with the power absorbed by said packaging material during the operation of supplying a sealing current;

calculating both a load impedance recognized by said source and an energy of the current generated by said source, and;

acquiring a difference in the distance between the jaws in said pair before and after sealing.

2. A method as claimed in claim 1, wherein the operation of measuring electric output quantities which correlate with the power absorbed further comprises monitoring both parameters relative to power supplied by said inductor to said packaging material and parameters relative to a temperature of said layer of electrically conducting material.

3. A method as claimed in claim 2, wherein said step of monitoring parameters relative to a temperature of the electrically conducting layer further comprises determining characteristics of a pressure exerted by said pair of jaws on said tube.

4. A method as claimed in claim 3, wherein said step of determining pressure characteristics further comprises monitoring at least one of the following: monitoring longitudinal variations in pressure of said pair of jaws; monitoring a pressure of said jaws; monitoring a soundness of said jaws; monitoring defects in a second of said jaws; and monitoring a lack of parallelism between said first and said second jaw.

5. A method as claimed in claim 4, wherein said step of monitoring longitudinal variations in pressure of said jaws further comprises acquiring a compression value of said tube during sealing.

6. A method as claimed in claim 5, wherein said step of monitoring a pressure of said jaws further comprises:
    acquiring a signal of hydraulic pressure exerted on at least one of said jaws during said compression step; and
    acquiring the compression value.

7. A method as claimed in claim 5, wherein said step of monitoring a soundness of said jaws further comprises:
    acquiring said compression value.

8. A method as claimed in claim 5, wherein said step of monitoring defects in a second of said jaws further comprises:
    acquiring said compression value.

9. A method as claimed in claim 5, wherein said step of monitoring a lack of parallelism between said first jaw and said second jaw further comprises:
    acquiring said compression value.

10. A method as claimed in claim 2, wherein said step of monitoring parameters relative to the power supplied further comprises monitoring power generated by a source.

11. A method as claimed in claim 10, wherein said step of monitoring power generated by a source further comprises monitoring at least one of the following: monitoring variations in a supply voltage of said source; monitoring an absence of said electric current; monitoring a sealing time.

12. A method as claimed in claim 11, wherein said step of monitoring variations in a supply voltage further comprises acquiring a load error signal from said source.

13. A method as claimed in claim 11, wherein said step of monitoring an absence of said electric current further comprises:
    acquiring a value of said electric current.

14. A method as claimed in claim 11, wherein said step of monitoring a sealing time further comprises:
    measuring a length of a sealing control signal supplied by a source and calculating energy supplied to said inductor.

15. A method as claimed in claim 2, wherein said step of monitoring parameters relative to the supplied power further comprises monitoring power transferred by said inductor.

16. A method as claimed in claim 15, wherein said step of monitoring the power transferred further comprises at least one of the following: monitoring energy losses of said inductor; monitoring creeping currents; monitoring resistances of members for transmitting said sealing current to said inductor; or monitoring cooling of said inductor.

17. A method as claimed in claim 10, wherein said step of monitoring energy losses further comprises the step of acquiring a compression value of said tube during sealing, a temperature value of a cooling fluid of said inductor, and a load impedance value of said source.

18. A method as claimed in claim 16, wherein the step of monitoring creeping currents further comprises:
    acquiring a phase angle value of said electric output quantities.

19. A method as claimed in claim 16, wherein the step of monitoring resistances of members for transmitting said sealing current further comprises:
    acquiring a phase angle value of said electric output quantities.

20. A method as claimed in claim 16, wherein the step of monitoring cooling of said inductor further comprises:
    acquiring a temperature value before and after sealing.

21. A method as claimed in claim 2, wherein said step of monitoring parameters relative to a temperature of the electrically conducting layer further comprises monitoring a temperature of the pourable food product fed into said tube.

22. A method as claimed in claim 21, wherein said step of monitoring parameters relative to a temperature of the electrically conducting layer further comprises determining characteristics of said packaging material.

23. A method as claimed in claim 22, wherein said step of determining characteristics of said packaging material further comprises at least one of the following: monitoring a thickness of said electrically conducting layer; monitoring a thickness of said layer of fibrous material; monitoring local variations in the thickness of said heat-seal layer; monitoring a thickness of said heat-seal layer; monitoring a quality of said heat-seal layer; and monitoring a type of packaging material.

24. A method as claimed in claim 23, wherein said step of monitoring a thickness of said electrically conducting layer further comprises measuring said thickness directly and acquiring a load impedance value of said source and a phase angle value of said electric output quantities.

25. A method as claimed in claim 23, wherein said step of monitoring a thickness of said layer of fibrous material further comprises:
    acquiring a compression value of said tube during sealing; and
    acquiring a distance value between the jaws of the pair of jaws prior to sealing.

26. A method as claimed in claim 23, wherein said step of monitoring local variations in a thickness of said heat-seal layer further comprises:
    acquiring a compression value of said tube.

27. A method as claimed in claim 23, wherein said step of monitoring a thickness of said heat-seal layer further comprises:
    acquiring a compression value of said tube.

28. A method as claimed in claim 23, wherein said step of monitoring a quality of said heat-seal layer further comprises:
    acquiring a compression value of said tube.

29. A method as claimed in claim 23, wherein said step of monitoring a type of packaging material further comprises:
    acquiring a compression value of said tube; and
    acquiring said phase angle.

30. A method as claimed in claim 1, wherein said electric output quantities comprise a current, voltage and phase angle generated by a source.

31. A method as claimed in claim 1, further comprising acquiring a load error signal from a source.

32. A method as claimed in claim 1, further comprising calculating both a load impedance recognized by said source and an energy of the current generated by said source.

33. A method as claimed in claim 32, further comprising acquiring at least one of the following: a thickness of said electrically conducting layer; a distance between the jaws in said pair; a difference in the distance between the jaws in said pair before and after sealing; a temperature of a cooling fluid of said inductor; a pressure exerted by said jaws; or a temperature of said pourable food product.

34. A method as claimed in claim 1, further comprising determining movement of cutting blades for cutting said tube after sealing.

35. A method as claimed in claim 34, wherein said step of determining movement of cutting blades for cutting said tube further comprises acquiring a load impedance value of a source and a phase angle value of said electric output quantities.

36. A packaging unit comprising a sealing device for sealing a tube made of packaging material having an electrically conducting layer, a heat-seal layer, and a layer of fibrous material, and filled with a pourable food product; said sealing device comprising:
   at least one pair of jaws where a first jaw carries an inductor;
   means for mutually compressing said jaws, a sealing current source connected to said inductor and generating a sealing current; and measuring means for measuring electric output quantities relative to said electric current;
   wherein measuring means measures quantities correlating with power absorbed by said packaging material during sealing; and
   means for calculating a difference in a distance between the jaws in said pair before sealing and after sealing.

37. A packaging unit as claimed in claim 36, wherein a processing unit including a neural network for receiving both said electric quantities and said quantities correlating with the power absorbed, and generating a fault signal.

38. A method of monitoring transverse sealing on a packaging unit comprising a sealing current source and at least one pair of jaws; at least a first of the jaws in said pair carrying an inductor; the method comprising the steps of:
   compressing a tube of packaging material, the packaging material having at least one electrically conducting layer, a heat-seal layer, and a layer of fibrous material which is filled with a pourable food product;
   supplying said inductor, during the compressing step, with an electric current to generate a sealing current in said electrically conducting layer;
   measuring electric output quantities relative to said electric current, wherein the operation of measuring electric output quantities correlates with the power absorbed by said packaging material during the operation of supplying a sealing current;
   calculating both a load impedance recognized by said source and an energy of the current generated by said source; and
   acquiring a difference in the distance between the jaws in said pair before and after sealing.

39. A method of monitoring transverse sealing on a packaging unit comprising a sealing current source and at least one pair of jaws; at least a first of the jaws in said pair carrying an inductor; the method comprising the steps of:
   compressing a tube of packaging material, the packaging material having at least one electrically conducting layer, a heat-seal layer, and a layer of fibrous material which is filled with a pourable food product;
   supplying said inductor, during the compressing step, with an electric current to generate a sealing current in said electrically conducting layer;
   measuring electric output quantities relative to said electric current, where the operation of measuring electric output quantities correlates with the power absorbed by said packaging material during the operation of supplying a sealing current;
   monitoring both parameters relative to power supplied by said inductor to said packaging material and parameters relative to a temperature of said layer of electrically conducting material;
   monitoring a temperature of the pourable food product fed into said tube;
   determining characteristics of said packaging material; and
   monitoring a difference in the distance between the jaws in said pair before and after sealing.

40. A method of monitoring transverse sealing on a packaging unit comprising a sealing current source and at least one pair of jaws; at least a first of the jaws in said pair carrying an inductor; the method comprising the steps of:
   compressing a tube of packaging material, the packaging material having at least one electrically conducting layer, a heat-seal layer, and a layer of fibrous material which is filled with a pourable food product;
   supplying said inductor, during the compressing step, with an electric current to generate a sealing current in said electrically conducting layer;
   measuring electric output quantities relative to said electric current, where the operation of measuring electric output quantities correlates with the power absorbed by said packaging material during the operation of supplying a sealing current;
   monitoring both parameters relative to power supplied by said inductor to said packaging material and parameters relative to a temperature of said layer of electrically conducting material;
   monitoring a temperature of the pourable food product fed into said tube;
   determining characteristics of said packaging material;
   monitoring a difference in the distance between the jaws in said pair before and after sealing; a temperature of a cooling fluid of said inductor;
   measuring said thickness directly;
   acquiring a load impedance value of said source; and
   acquiring a phase angle value of said electric output quantities.

41. A method of monitoring transverse sealing on a packaging unit comprising a sealing current source and at least one pair of jaws; at least a first of the jaws in said pair carrying an inductor; the method comprising the steps of:
   compressing a tube of packaging material, the packaging material having at least one electrically conducting layer, a heat-seal layer, and a layer of fibrous material which is filled with a pourable food product;
   supplying said inductor, during the compressing step, with an electric current to generate a sealing current in said electrically conducting layer;
   measuring electric output quantities relative to said electric current, wherein the operation of measuring electric output quantities correlates with the power absorbed by said packaging material during the operation of supplying a sealing current; and acquiring a difference in the distance between the jaws in said pair before and after sealing.

42. A method of monitoring transverse sealing on a packaging unit comprising a sealing current source and at least one pair of jaws; at least a first of the jaws in said pair carrying an inductor; the method comprising the steps of:

compressing a tube of packaging material, the packaging material having at least one electrically conducting layer, a heat-seal layer, and a layer of fibrous material which is filled with a pourable food product;

supplying said inductor, during the compressing step, with an electric current to generate a sealing current in said electrically conducting layer;

measuring electric output quantities relative to said electric current, wherein the operation of measuring electric output quantities correlates with the power absorbed by said packaging material during the operation of supplying a sealing current, the operation of measuring electric output quantities which correlates with the power absorbed further comprising monitoring both parameters relative to power supplied by said inductor to said packaging material and parameters relative to a temperature of said layer of electrically conducting material, where said step of monitoring parameters relative to a temperature of the electrically conducting layer further comprises determining characteristics of said packaging material; and the step of determining characteristics of said packaging material further comprising monitoring a difference in the distance between the jaws in said pair before and after sealing.

43. A method of monitoring transverse sealing on a packaging unit comprising a sealing current source and at least one pair of jaws; at least a first of the jaws in said pair carrying an inductor; the method comprising the steps of:

compressing a tube of packaging material, the packaging material having at least one electrically conducting layer, a heat-seal layer, and a layer of fibrous material which is filled with a pourable food product;

supplying said inductor, during the compressing step, with an electric current to generate a sealing current in said electrically conducting layer;

measuring electric output quantities relative to said electric current, where the operation of measuring electric output quantities correlates with the power absorbed by said packaging material during the operation of supplying a sealing current, the operation of measuring electric output quantities which correlate with the power absorbed further comprising monitoring both parameters relative to power supplied by said inductor to said packaging material and parameters relative to a temperature of said layer of electrically conducting material, where said step of monitoring parameters relative to a temperature of the electrically conducting layer further comprises monitoring a temperature of the pourable food product fed into said tube, said step of monitoring parameters relative to a temperature of the electrically conducting layer further comprises determining characteristics of said packaging material; and the step of determining characteristics of said packaging material further comprising monitoring a type of packaging material, wherein said step of monitoring a thickness of said electrically conducting layer further comprises measuring said thickness directly and acquiring a load impedance value of said source and a phase angle value of said electric output quantities; and a difference in the distance between the jaws in said pair before and after sealing.

44. A method of monitoring transverse sealing on a packaging unit comprising a sealing current source and at least one pair of jaws; at least a first of the jaws in said pair carrying an inductor; the method comprising the steps of:

compressing a tube of packaging material comprising at least one electrically conducting layer, a heat-seal layer, and a layer of fibrous material, and which is filled with a pourable food product;

supplying said inductor, during the compressing step, with an electric current to generate a sealing current in said electrically conducting layer;

measuring electric output quantities relative to said electric current; and measuring quantities correlated with the power absorbed by said packaging material during said step of supplying a sealing current, wherein said step of measuring quantities comprises calculating a difference in the distance between the jaws in said pair before and after sealing.

45. A method of monitoring transverse sealing on a packaging unit comprising a sealing current source and at least one pair of jaws; at least a first of the jaws in said pair carrying an inductor; the method comprising the steps of:

compressing a tube of packaging material, the packaging material having at least one electrically conducting layer, a heat-seal layer, and a layer of fibrous material which is filled with a pourable food product;

supplying said inductor, during the compression operation, with an electric current to generate a sealing current in said electrically conducting layer;

measuring electric output quantities relative to said electric current, wherein the operation of measuring electric output quantities correlates with power absorbed by said packaging material during the operation of supplying a sealing current, the operation of measuring electric output quantities including monitoring parameters relative to power supplied by the inductor to the packaging material and monitoring parameters relative to a temperature of the electrically conducting layer, the operation of monitoring parameters relative to a temperature of the electrically conducting layer including determining characteristics of the packaging material, wherein the operation of determining characteristics of the packaging material includes at least one of the following:

monitoring a thickness of said electrically conducting layer;

monitoring a thickness of said layer of fibrous material;

monitoring a thickness of said heat-seal layer;

monitoring local variations in the thickness of said heat-seal layer;

monitoring a quality of said heat-seal layer; and monitoring a type of packaging material;

calculating both a load impedance recognized by said source and an energy of the current generated by said source; and acquiring at least one of the following:

a distance between the jaws in said pair;

a difference in the distance between the jaws in said pair before and after sealing;

a temperature of a cooling fluid of said inductor;

a pressure exerted by said jaws; or a temperature of said pourable food product.

46. A method as claimed in claim 45, wherein said operation of monitoring a thickness of said electrically conducting layer further comprises measuring said thickness directly and acquiring a load impedance value of said source and a phase angle value of said electric output quantities.

47. A method as claimed in claim 46, wherein said operation of monitoring a thickness of said layer of fibrous material further comprises acquiring a compression value of said tube during sealing and a distance value between the jaws in said pair before sealing.

48. A method as claimed in claim 47, wherein said operation of monitoring local variations in the thickness of said heat-seal layer further comprises acquiring said compression value of said tube.

49. A method as claimed in claim 47, wherein said operation of monitoring a thickness of said heat-seal layer further comprises acquiring said compression value of said tube.

50. A method as claimed in claim 47, wherein said operation of monitoring a quality of said heat-seal layer further comprises acquiring said compression value of said tube.

51. A method as claimed in claim 47, wherein said operation of monitoring a type of packaging material further comprises acquiring said compression value of said tube and said phase angle value.

* * * * *